US007115295B1

(12) United States Patent
Singh et al.

(10) Patent No.: US 7,115,295 B1
(45) Date of Patent: Oct. 3, 2006

(54) METHODS OF PREPARING CORN FIBER OIL AND OF RECOVERING CORN ALEURONE CELLS FROM CORN FIBER

(75) Inventors: Vijay Singh, Savoy, IL (US); Robert A. Moreau, Quakertown, PA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 597 days.

(21) Appl. No.: 10/373,509

(22) Filed: Feb. 25, 2003

Related U.S. Application Data

(60) Provisional application No. 60/360,086, filed on Feb. 26, 2002.

(51) Int. Cl.
*A23L 1/10* (2006.01)

(52) U.S. Cl. .................. 426/489; 426/481; 426/618

(58) Field of Classification Search ............... 426/489, 426/481, 618
See application file for complete search history.

(56) References Cited

U.S. PATENT DOCUMENTS

| | | | | |
|---|---|---|---|---|
| 2,379,184 A | * | 6/1945 | Rakowsky et al. | 426/482 |
| 2,472,971 A | * | 6/1949 | Hansen | 127/68 |
| 2,760,635 A | * | 8/1956 | Dahlstrom | 426/484 |
| 3,519,431 A | * | 7/1970 | Wayne | 426/417 |
| 6,254,914 B1 | | 7/2001 | Singh et al. | 426/482 |

OTHER PUBLICATIONS

Singh, V., et al., "Effect of Corn Milling Practices on Aleurone Layer Cells and Their Unique Phytosterols", *Cereal Chemistry*, vol. 78(4), pp. 436-441, 2001.

Moreau, R.A., et al., "Extraction and Quantitative Analysis of Oil from Commercial Corn Fiber", *J. Agric. Food Chem.*, vol. 44(8), pp. 2149-2154, 1996.

Eckhoff, S.R., et al., "A Laboratory Wet-Milling Procedure to Increase Reproducibility and Accuracy of Product Yields", *Cereal Chem.*, vol. 70(6), pp. 723-727, 1993.

Wolf, M.J., et al., "Structure of the Mature Corn Kernal. III Microscopic Structure of the Endosperm of Dent Corn", *Cereal Chem.*, vol. 29, pp. 349-361, Sep. 1952.

Watson, S. A., 1984, Corn and sorghum starches: Production, pp. 417-468, in: Starch: Chemistry and Technology, R. L. Whistler, J.N. BeMiller, and E. F. Paschall, eds., Academic Press, Orlando, FL.

* cited by examiner

*Primary Examiner*—Anthony Weier
(74) *Attorney, Agent, or Firm*—John D. Fado; G. Byron Stover

(57) ABSTRACT

A method for preparing corn fiber oil involving separating corn fiber from corn kernels (e.g., by a wet milling process), drying the corn fiber, grinding the dried corn fiber to produce ground corn fiber having a particle size of less than about 100 microns, combining the ground corn fiber with an aqueous solution having a specific gravity effective to float aleurone cells, removing the floating aleurone fraction, drying the aleurone fraction to form a dried aleurone fraction, grinding the dried aleurone fraction to form a ground aleurone fraction, extracting corn fiber oil from the ground aleurone fraction by a way selected from the group consisting of an organic solvent and supercritical fluid extraction, and separating the extracted corn fiber oil from the extraction medium. Also shown is a method of recovering corn aleurone cells from corn fiber involving separating corn fiber from corn kernels by a wet milling process, drying the corn fiber, grinding the dried corn fiber to produce ground corn fiber having a particle size of less than about 100 microns, combining the ground corn fiber with an aqueous solution having a specific gravity effective to float aleurone cells, and removing the floating aleurone fraction.

26 Claims, 1 Drawing Sheet

METHODS OF PREPARING CORN FIBER OIL AND OF RECOVERING CORN ALEURONE CELLS FROM CORN FIBER This application claims the benefit of U.S. Provisional Application No. 60/360,086, filed 26 Feb. 2002, which is incorporated herein by reference in its entirety.

BACKGROUND OF THE INVENTION

The present invention relates to a method for preparing corn fiber oil involving separating corn fiber from corn kernels (e.g., by a wet milling process), drying the corn fiber, grinding the dried corn fiber to produce ground corn fiber having a particle size of less than about 100 microns, combining the ground corn fiber with an aqueous solution having a specific gravity effective to float aleurone cells, removing the floating aleurone fraction, drying the aleurone fraction to form a dried aleurone fraction, grinding the dried aleurone fraction to form a ground aleurone fraction, extracting corn fiber oil from the ground aleurone fraction by means selected from the group consisting of an organic solvent and supercritical fluid extraction, and separating the extracted corn fiber oil from the extraction medium. The present invention also relates to a method of recovering corn aleurone cells from corn fiber involving separating corn fiber from corn kernels by a wet milling process, drying the corn fiber, grinding the dried corn fiber to produce ground corn fiber having a particle size of less than about 100 microns, combining the ground corn fiber with an aqueous solution having a specific gravity effective to float aleurone cells, and removing the floating aleurone fraction.

Corn (maize) fiber oil contains unique compounds called phytosterols that have been shown to have nutraceutical properties (U.S. Pat. No. 5,843,499 which is incorporated by reference in its entirety). Due to their nutraceutical value, commercial corn fiber oil-based products can potentially be sold for $11 to $22/kg ($5 to $10/lb) based on the current market retail price of products similar to corn fiber oil. The amount of oil in corn fiber is very low, approximately 1.5 to 3.0%. Due to the low concentration of oil in corn fiber, the extraction of the oil and its phytosterol compounds is not efficient and can be expensive. Singh et al. (Cereal Chem., 78(4): 436–441 (2001)) showed that more than 90% of the corn fiber oil comes from the aleurone layer, which is approximately 40% of the coarse (pericarp) fiber fraction. Among the different classes of phytosterol compounds present in the corn fiber oil, more than 95% of the ferulate phytosterol esters (FPE), 60% of free phytosterols (St) and 90% of fatty acyl phytosterol esters (St:E) are present in the oil recovered from the aleurone layer (Cereal Chem., 78(4): 436–441 (2001)).

The aleurone layer in most yellow dent corn hybrids is a single layer of cells located directly beneath the pericarp tissue (Watson, S. A., 1984, Corn and sorghum starches: Production, pages 417–468, in: Starch: Chemistry and Technology, R. L. Whistler, J. N. BeMiller, and E. F. Paschall, eds., Academic Press, Orlando, Fla.). During the conventional corn wet milling process the aleurone layer ends up in the fiber fraction.

The present study tested whether the aleurone layer could provide an enriched source of corn fiber oil and phytosterol compounds by attempting to separate the aleurone layer from other parts of the wet milled fiber fraction. Higher concentration of oil and phytosterol could make the extraction more efficient and less expensive. In the present study an effort was made to increase the concentration of the oil and phytosterols in corn fiber by floatation of the fiber tissue associated with the oil bodies (aleurone cells) in the fiber fraction.

SUMMARY OF THE INVENTION

The present invention relates to a method of recovering corn aleurone cells from corn fiber and optionally preparing corn fiber oil from corn aleurone cells by dried corn fiber to produce ground corn fiber having a particle size of less than about 100 microns, combining the ground corn fiber with an aqueous solution having a specific gravity effective to float aleurone cells, and removing the floating aleurone fraction; and optionally drying the aleurone fraction to form a dried aleurone fraction, grinding the dried aleurone fraction to form a ground aleurone fraction, extracting corn fiber oil from the ground aleurone fraction by means selected from the group consisting of an organic solvent and supercritical fluid extraction, and separating the extracted corn fiber oil from the extraction medium. The present invention also relates to a method of preparing corn fiber oil from corn aleurone cells by grinding dried corn fiber to produce ground corn fiber having a particle size of less than about 100 microns, combining the ground corn fiber with an aqueous solution having a specific gravity effective to float aleurone cells, removing the floating aleurone fraction, drying the aleurone fraction to form a dried aleurone fraction, grinding the dried aleurone fraction to form a ground aleurone fraction, extracting corn fiber oil from the ground aleurone fraction by means selected from the group consisting of an organic solvent and supercritical fluid extraction, and separating the extracted corn fiber oil from the extraction medium. Furthermore, the present invention also relates to a method of recovering corn aleurone cells from corn fiber by grinding dried corn fiber to produce ground corn fiber having a particle size of less than about 100 microns, combining the ground corn fiber with an aqueous solution having a specific gravity effective to float aleurone cells, and removing the floating aleurone fraction.

DETAILED DESCRIPTION OF THE INVENTION

Figure 1:
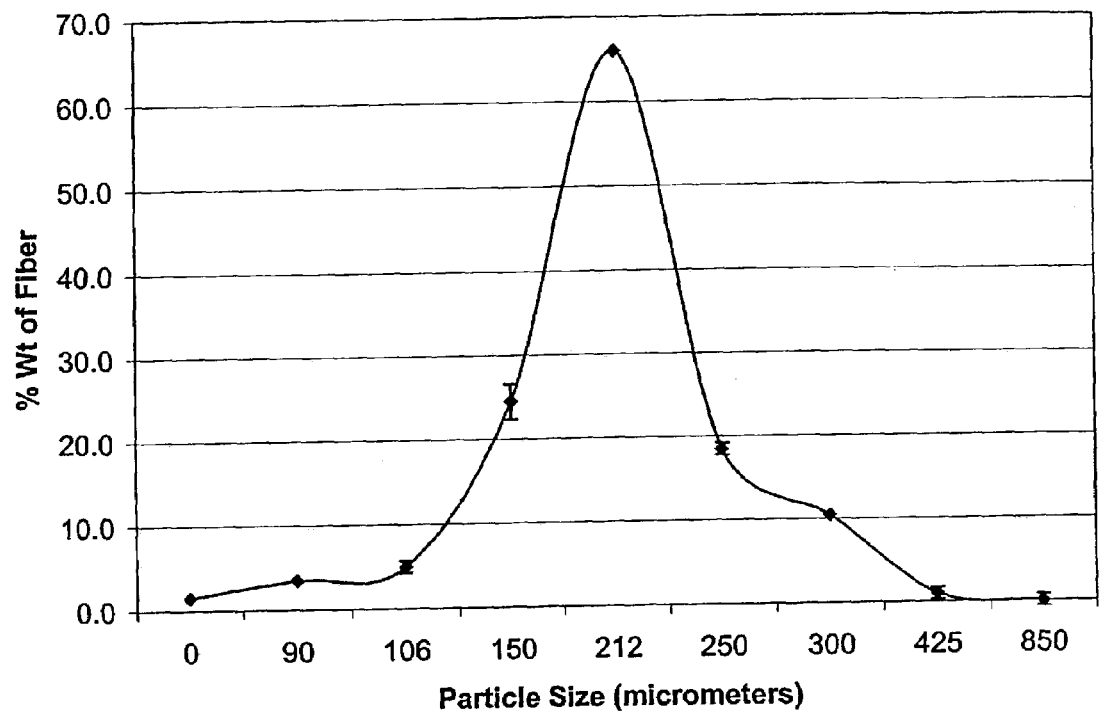
FIG. 1 shows the particle size of ground corn fiber.

Corn fiber is an abundant low-value by-product obtained during the "wet-milling" of corn in the process of producing starch, corn sweeteners and ethanol. It is defined herein as the product obtained from the wet-milling process, which involves an initial steeping of corn kernels in aqueous $SO_2$ at an elevated temperature followed by gentle grinding and physical separation of the outer fiber layers from starch, protein and other components. Wet-milling of corn is used by all companies that produce cornstarch and corn sweeteners, and by many companies that produce fuel ethanol from corn. "Dry milling" of corn involves grinding of the corn kernels and separating a product called "corn bran" without steeping.

Corn fiber oil may be prepared according to the following steps: separating corn fiber (containing the pericarp layer and aleurone cells) from corn kernels, generally by a wet milling process, drying the corn fiber, grinding the corn fiber to a particle size of less than about 100 microns, combining the ground corn fiber with an aqueous solution (e.g., water) having a specific gravity effective to float aleurone cells (the aleurone fraction), removing the floating aleurone fraction, drying the aleurone fraction to form a dried aleurone fraction, grinding the dried aleurone fraction to form a ground aleurone fraction, extracting corn fiber oil from the ground aleurone fraction (e.g., by an organic solvent or supercritical fluid extraction), and separating the extracted aleurone oil from the extraction medium.

Corn fiber may be separated from the corn kernel by a wet milling process involving steeping corn kernels in aqueous $SO_2$ (about 0.12 to about 0.20%, v/v) at about 50° C. to about 55° C. for about 24 to about 48 hours, followed by a gentle grinding and physical separation of the outer fiber layers from the remainder of the kernel. The outer fiber layers contain the outer and inner pericarp and aleurone layers. Generally, gentle grinding releases the germ from the corn kernel without breaking the germ, the germ is then floated and separated out using a hydrocyclone and the remaining slurry is finely ground (to release any bound starch from the fiber) and screened using sieves to separate out the fiber. Corn fiber may also be separated from the corn kernel by a dry milling process, dry grind process, wet milling and dry milling hybrid process, alkali corn processing (known in the industry as the Masa Process), or any other existing processing technologies capable of producing corn fiber.

The corn fiber may be dried at a temperature of about 25° C. to about 65° C., followed by grinding of the samples. The time and temperature of the drying step is not critical so long as the corn fiber is sufficiently dry to be easily worked with; for example, drying at room temperature for a time sufficient to achieve dryness of the corn fibers is effective. The corn fiber must be ground to a particle size of less than about 100 microns, preferably less than about 70 microns, more preferably less than about 50 microns, most preferably about 20 microns; other means of reducing the particles size could be chemical (e.g., treatment with an acid such as dilute sulfuric acid) or enzymatic (e.g., treatment with cell wall degrading enzymes such as cellulase), either of which would eliminate the need for the first drying step. Industrial processes such as the following may also be useful to mill corn fiber to a smaller particle size and thus result in the floatation of a larger proportion of aleurone cells, creating a better feedstock for Corn Fiber Oil: ultrasonic processors (e.g., such as those marketed by Cole Parmer), hammer mills with very small screen size (e.g., sieve #200 or 270), high pressure water mills (e.g., described in U.S. Pat. No. 6,318,649).

The ground corn fiber is combined with an aqueous solution (e.g., water) having a specific gravity effective to float aleurone cells. The floating aleurone fraction is removed (e.g., by skimming or using equipment (such as hydrocyclones or centrifuges) that allows separation of components based on density differences). The aleurone fraction is dried for a time and temperature sufficient to lower the moisture content of the fiber to approximately 10% (e.g., about 24 hours at about 60° C. or about 3 hours at about 102° C.); generally the time and temperature is not critical so long as the moisture content is reduced enough to facilitate handling. The dried aleurone fraction is ground to a particle size less than about 100 microns, preferably less than about 70 microns. Corn fiber oil is extracted from the ground, dried aleurone fraction by utilizing any effective organic solvent, hexane being preferred. Generally, the ground aleurone fraction and solvent are mixed and shaken for about one hour at a temperature of about 25° C. Alternatively, extraction may be carried out by supercritical fluid extraction, a technique which is conventional and well-known in the art. Effective extraction conditions with supercritical $CO_2$ are about 25 min at about 2.5 L/min, about 10,000 psi and about 40° C. The corn fiber oil is separated from the extraction medium by conventional separation means which are effective, such as filtration of the extract and evaporation of the solvent.

The following examples are intended only to further illustrate the invention and are not intended to limit the scope of the invention as defined by the claims.

EXAMPLES

Materials and Methods:

A yellow dent corn hybrid (33A13) grown during the 2000 crop season at the Agricultural Engineering Farm, University of Illinois at Urbana-Champaign, was field dried to approximately 15% moisture content and combine harvested. Corn samples were hand cleaned to remove broken corn and foreign material, packaged in plastic bags and stored at 4° C. until wet-milling. The whole kernel moisture content of the samples was measured using the 103° C. convection oven method (American Association of Cereal Chemists, 2000a, Approved Methods of the AACC, 8th ed., Method 44-15SA, The Association, St Paul, Minn.).

The wet-milling of the samples for the fiber fraction was done using the 1-kg laboratory corn wet milling procedure described by Eckhoff et al. (Cereal Chem., 70: 723–727 (1993)). Fiber samples were dried in a convective oven and ground using a Magic Mill (Model No. 100, Magic Mill Inc., Monsey, N.Y.). Particle size analysis of the ground fiber was done using standard sieves and sieve shaker (Model No. RX-86, W. S Tyler, Mentor, Ohio) (American Association of Cereal Chemists, 2000b, Approved Methods of the AACC, 8th ed., Method 20-10, The Association, St Paul, Minn.). Five grams of ground fiber was added to 400 ml water solution with different specific gravities; the fiber was stirred in the solution and then added to a 500 ml separatory funnel. The solution in the separatory funnel was kept for 1 min and the bottom layer of the fiber that did not float was removed. The fiber fraction that floated was called the "Floated Material" or FM and the fiber fraction that did not float and settled down was called "Settled Material" or SM. Solutions with three different specific gravities, 1.00, 1.04 and 1.09, were evaluated for separation of fiber. Sodium nitrate was used to maintain the three specific gravities of the solutions. After separation, all the fiber samples were thoroughly rinsed with 1.0 L of distilled water and dried. Moisture content of fiber was measured by drying in a forced air convection oven (American Association of Cereal Chemists, 2000c, Approved Methods of the AACC, 8th ed., Method 44-18, The Association, St Paul, Minn.). All of the separations were done in duplicate and the samples were combined for oil and phytosterol analysis. Dried fiber samples were analyzed via HPLC at least twice. Results presented are the means of the duplicate analyses.

Based on the results of the first experiment, a second experiment was done in which commercial fiber fractions were obtained from two corn wet milling plants in the Midwest. The same protocol was used for grinding and floatation of fiber as described above. However, in the second experiment no sodium nitrate was added and a specific gravity of 1.00 was maintained for all experiments.

Recovered fiber samples were extracted using an Accelerated Solvent Extractor (Dionex ASE 200) using hexane as the solvent. Ground fiber samples (4g) were placed in 11 cc sample extraction cells. The extraction conditions in the cells were as follows: pressure of 1000 psi, temperature of 100° C., heat time of 5 min, start time of 10 min, 3 static cycles, 100% flush volume and purge time of 60 seconds. Due to small sample size the samples of pericarp and aleurone were extracted by placing them in hexane (1 g sample/10 ml hexane) and homogenizing them with a Polytron Homogenizer. Homogenized samples were extracted by shaking for 1 hr in a wrist action shaker at room temperature. After extraction, the hexane extracts' were filtered through a Whatman GF/A glass fiber filter (Whatman Laboratory Products, Clifton, N.J.) fitted in a Buchner funnel, with gentle vacuum.

For HPLC analysis, a part of the sample was removed from the extracted solvent, and the lipid classes in samples were separated and quantified by a modified version of an HPLC technique (Moreau, R. A., et al., J. Agric. Food Chem., 44: 2149–2154 (1996)). The ternary gradient HPLC system used was a Hewlett Packard Model 1050 modular system (Hewlett Packard, Avondale Pa.). Two detectors were connected in series. The first was a Hewlett Packard Model 1050 fixed wavelength UV-visible detector set at 295 nm. The second was an Alltec-Varex Mark III evaporative light scattering Detector (Alltech Associates, Deerfield, Ill.) operated at a temperature of 40° C., with nitrogen as a nebulizing gas at a flow rate of 1.60 L (STP)/min. The column was a Chromsep Cartridge, LiChrosorb DiOL, 5 µm, 3×100 mm (Chrompack, Raritan, N.J.). The mobile phase gradient was hexane/2-propanol/acetic acid (Moreau, R. A., et al., J. Agric. Food Chem., 44: 2149–2154 (1996)) and the flow rate was constant at 0.5 mL/min. The rest of the solvent sample was dried under nitrogen and heat using an N-EVAP analytical evaporator (Organomation Associates Inc., Berlin, Mass. 01503).

Results and Discussion:

In the first experiment, approximately 34.0 to 39.0% fiber was recovered as floated material (FM), depending upon the specific gravity of the solution. No significant increase in the FM was observed as the specific gravity was increased from 1.04 to 1.09 (Table I). Depending upon specific gravity of the solution, the oil content in the FM increased by approximately 24.5 to 51.1%, the FPE increased by approximately 24.9 to 37.5%, the St increased from 8.9 to 26.6% and the St:E increased from 6.7 to 25.8%, compared to oil, FPE, St and St:E in the original fiber. The biggest increase in the oil, FPE, St and St:E content was observed when the fiber was floated in only water (specific gravity of approximately 1.00) (Table I). A comparison between the total phytosterols recovered from FM and total phytosterol recovered in the original fiber shows that FM only recovers approximately 45 to 47% of total phytosterols recovered in the original fiber (Table I).

Based on the results of the first experiment another experiment was done in which commercial fiber samples were obtained from two corn wet milling plants. The samples were ground and floated only in water (specific gravity of 1.00). With these commercial fiber samples, approximately 18% of the fiber was recovered as FM. Significant enrichment of oil (approximately 53.3 to 86.4%) and individual phytosterols (approximately 6.1 to 76.3%) was observed in the FM compared to the original fiber samples (Table I). However, the total recovery of the phytosterols from the FM was only approximately 27.4 to 30.1%, compared to the total recovery of phytosterols from the original fiber (Table I).

The results from this study suggest that there is a significant enrichment of oil and individual phytosterols compounds in the FM compared to the original fiber, but the total recovery of phytosterols from the FM is very poor. Without being bound by theory, poor recovery of phytosterols from the FM is probably because all the fiber (aleurone) cells that contain the oil and the phytosterol did not float in the solution and, therefore, were not recovered in the FM. Aleurone layer cells are estimated to be approximately 7 to 70 microns in size, depending upon the position in the kernel (Wolf, M. J., et al., Cereal Chem., 29: 349–36 (1952)). However, the ground fiber produced from the Magic Mill had particle size distribution approximately ranging from 50 to 425 microns (FIG. 1), and more than 65% were approximately 212 microns in size. The particles size analysis of the ground fiber suggest that most of the aleurone layer cells were probably stuck together will the other cell wall material, which could have increased the density of the fiber particles and prevented them from floating.

The data herein proves our initial hypothesis that floatation can be used to enrich the oil and the phytosterol compounds in the corn fiber fraction. In order to get enrichment as well as good total recovery of oil and phytosterols, the fiber particle size should be less than 100 microns. Achieving a particles size of less than 100 microns should be very beneficial.

All of the references cited herein are incorporated by reference in their entirety. Also incorporated by reference in their entirety are the following: U.S. patent application Ser. No. 09/347,814 filed on 2 Jul. 1999; Ser. No. 09/955,329 filed on 18 Sep. 2001; and Ser. No. 09/871,566 filed on 31 May 2001; and U.S. Pat. Nos. 4,746,073 and 5,843,499 and 6,254,914.

Thus, in view of the above, the present invention concerns (in part) the following:

A method of recovering corn aleurone cells from corn fiber and optionally preparing corn fiber oil from corn aleurone cells, said method comprising (or consisting essentially of or consisting of) grinding dried corn fiber to produce ground corn fiber having a particle size of less than about 100 microns, combining said ground corn fiber with an aqueous solution having a specific gravity effective to float aleurone cells, and removing the floating aleurone fraction; and optionally drying said aleurone fraction to form a dried aleurone fraction, grinding said dried aleurone fraction to form a ground aleurone fraction, extracting corn fiber oil from said ground aleurone fraction by means selected from the group consisting of an organic solvent and supercritical fluid extraction, and separating the extracted corn fiber oil from the extraction medium.

The above method, further comprising (or consisting essentially of or consisting of) separating corn fiber from corn kernels (e.g., by a wet milling process) and drying said corn fiber.

The above method, wherein said particle size is less than about 70 microns or wherein said particle size is less than about 50 microns or wherein said particle size is about 20 microns.

The above method, wherein said separating corn fiber from corn kernels comprises (or consists essentially of or consist of) a wet milling process.

The above method, wherein said aqueous solution is water.

The above method, wherein said organic solvent is hexane.

The above method, wherein said ground aleurone fraction and said hexane are mixed and shaken for about one hour at a temperature of about 25° C.

The above method, said method comprising (or consisting essentially of or consisting of) grinding dried corn fiber to produce ground corn fiber having a particle size of less than about 100 microns, combining said ground corn fiber with an aqueous solution having a specific gravity effective to float aleurone cells, removing the floating aleurone fraction, drying said aleurone fraction to form a dried aleurone fraction, grinding said dried aleurone fraction to form a ground aleurone fraction, extracting corn fiber oil from said ground aleurone fraction by means selected from the group consisting of an organic solvent and supercritical fluid extraction, and separating the extracted corn fiber oil from the extraction medium.

A method of preparing corn fiber oil from corn aleurone cells, said method comprising (or consisting essentially of or consisting of) grinding dried corn fiber to produce ground corn fiber having a particle size of less than about 100 microns, combining said ground corn fiber with an aqueous solution having a specific gravity effective to float aleurone cells, removing the floating aleurone fraction, drying said aleurone fraction to form a dried aleurone fraction, grinding said dried aleurone fraction to form a ground aleurone fraction, extracting corn fiber oil from said ground aleurone fraction by means selected from the group consisting of an organic solvent and supercritical fluid extraction, and separating the extracted corn fiber oil from the extraction medium.

The above method, further comprising (or consisting essentially of or consisting of) separating corn fiber from corn kernels (e.g, by a wet milling process) and drying said corn fiber.

The above method, wherein said particle size is less than about 70 microns or wherein said particle size is less than about 50 microns or wherein said particle size is about 20 microns.

The above method, wherein said separating corn fiber from corn kernels comprises (or consists essentially of or consist of) a wet milling process.

The above method, wherein said aqueous solution is water.

The above method, wherein said organic solvent is hexane.

The above method, wherein said ground aleurone fraction and said hexane are mixed and shaken for about one hour at a temperature of about 25° C.

A method of recovering corn aleurone cells from corn fiber, said method comprising (or consisting essentially of or consisting of) grinding dried corn fiber to produce ground corn fiber having a particle size of less than about 100 microns, combining said ground corn fiber with an aqueous solution having a specific gravity effective to float aleurone cells, and removing the floating aleurone fraction.

The above method, further comprising (or consisting essentially of or consisting of) separating corn fiber from corn kernels (e.g., by a wet milling process) and drying said corn fiber.

The above method, wherein said particle size is less than about 70 microns or wherein said particle size is less than about 50 microns or wherein said particle size is about 20 microns.

The above method, wherein said separating corn fiber from corn kernels comprises (or consists essentially of or consist of) a wet milling process.

The above method, wherein said aqueous solution is water.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method of recovering corn aleurone cells from corn fiber and optionally preparing corn fiber oil from corn aleurone cells, said method comprising grinding dried corn fiber to produce ground corn fiber having a particle size of less than about 100 microns, combining said ground corn fiber with an aqueous solution having a specific gravity effective to float aleurone cells, and removing the floating aleurone fraction; and optionally drying said aleurone fraction to form a dried aleurone fraction, grinding said dried aleurone fraction to form a ground aleurone fraction, extracting corn fiber oil from said ground aleurone fraction by extraction medium selected from the group consisting of an organic solvent and supercritical fluid extraction, and separating the extracted corn fiber oil from said extraction medium.

2. The method according to claim 1, further comprising separating corn fiber from corn kernels and drying said corn fiber.

3. The method according to claim 1, wherein said particle size is less than about 70 microns.

4. The method according to claim 1, wherein said particle size is less than about 50 microns.

5. The method according to claim 1, wherein said particle size is about 20 microns.

6. The method according to claim 2, wherein said separating corn fiber from corn kernels comprises a wet milling process.

7. The method according to claim 1 wherein said aqueous solution is water.

8. The method according to claim 1, wherein said organic solvent is hexane.

9. The method according to claim 8, wherein said ground aleurone fraction and said hexane are mixed and shaken for about one hour at a temperature of about 25° C.

10. The method according to claim 1, said method comprising grinding dried corn fiber to produce ground corn fiber having a particle size of less than about 100 microns, combining said ground corn fiber with an aqueous solution having a specific gravity effective to float aleurone cells, removing the floating aleurone fraction, drying said aleurone fraction to form a dried aleurone fraction, grinding said dried aleurone fraction to form a ground aleurone fraction, extracting corn fiber oil from said ground aleurone fraction by extraction medium selected from the group consisting of an organic solvent and supercritical fluid extraction, and separating the extracted corn fiber oil from said extraction medium.

11. A method of preparing corn fiber oil from corn aleurone cells, said method comprising grinding dried corn fiber to produce ground corn fiber having a particle size of less than about 100 microns, combining said ground corn fiber with an aqueous solution having a specific gravity effective to float aleurone cells, removing the floating aleurone fraction, drying said aleurone fraction to form a dried aleurone fraction, grinding said dried aleurone fraction to form a ground aleurone fraction, extracting corn fiber oil from said ground aleurone fraction by means extraction medium selected from the group consisting of an organic solvent and supercritical fluid extraction, and separating the extracted corn fiber oil from said extraction medium.

12. The method according to claim 11, further comprising separating corn fiber from corn kernels and drying said corn fiber.

13. The method according to claim 11, wherein said particle size is less than about 70 microns.

14. The method according to claim 11, wherein said particle size is less than about 50 microns.

15. The method according to claim 11, wherein said particle size is about 20 microns.

16. The method according to claim 12, wherein said separating corn fiber from corn kernels comprises a wet milling process.

17. The method according to claim 11, wherein said aqueous solution is water.

18. The method according to claim 11, wherein said organic solvent is hexane.

19. The method according to claim 18, wherein said ground aleurone fraction and said hexane are mixed and shaken for about one hour at a temperature of about 25° C.

20. A method of recovering corn aleurone cells from corn fiber, said method comprising grinding dried corn fiber to produce ground corn fiber having a particle size of less than about 100 microns, combining said ground corn fiber with an aqueous solution having a specific gravity effective to float aleurone cells, and removing the floating aleurone fraction.

21. The method according to claim 20, further comprising separating corn fiber from corn kernels and drying said corn fiber.

22. The method according to claim 20, wherein said particle size is less than about 70 microns.

23. The method according to claim 20, wherein said particle size is less than about 50 microns.

24. The method according to claim 20, wherein said particle size is about 20 microns.

25. The method according to claim 20, wherein said separating corn fiber from corn kernels comprises a wet milling process.

26. The method according to claim 20, wherein said aqueous solution is water.

* * * * *